United States Patent
Wales

[11] 3,952,644
[45] Apr. 27, 1976

[54] FOOD SERVING DEVICE

[76] Inventor: George A. Wales, 1519 S. Andrews Ave., Fort Lauderdale, Fla. 33316

[22] Filed: Apr. 30, 1974

[21] Appl. No.: 465,559

[52] U.S. Cl. .................................. 99/419; 222/108
[51] Int. Cl.² ........................................ A47J 37/04
[58] Field of Search ................... 99/419, 420–421, 99/446, 483; 122/367; 126/246, 273.5, 375, 400; 165/4, 18, 184–185; 220/23.2, 23.4; 222/108

[56] References Cited
UNITED STATES PATENTS

| | | | |
|---|---|---|---|
| 1,256,434 | 2/1918 | Bozzella | 222/108 |
| 2,234,423 | 3/1941 | Wittmann | 165/184 X |
| 2,519,115 | 8/1950 | Costakos | 222/108 |
| 2,561,538 | 7/1951 | Schultz | 99/420 |
| 2,564,571 | 8/1951 | Havens | 99/419 X |
| 2,582,735 | 1/1952 | Alaj | 126/273.5 X |
| 2,826,982 | 3/1958 | Smith | 99/419 X |
| 2,835,480 | 5/1958 | Perez | 99/419 X |
| 3,010,385 | 11/1961 | Rappaport | 99/421 HV |
| 3,584,683 | 6/1971 | Gordon | 99/419 |
| 3,738,525 | 6/1973 | Knapp | 220/23.4 |

Primary Examiner—Peter Feldman
Assistant Examiner—Arthur O. Henderson
Attorney, Agent, or Firm—Cushman, Darby & Cushman

[57] ABSTRACT

A food serving device for use at a dining table comprises a body of heat conducting material carrying a plurality of skewers to hold small pieces of meat or other food pieces. The body is heated and serves as a heat source to maintain the food warm during serving. A support is provided for suspending the body over receptacles to catch drippings from the food and to hold sauces into which the food pieces may be dipped after removal from the skewers.

7 Claims, 2 Drawing Figures

U.S. Patent    April 27, 1976    3,952,644
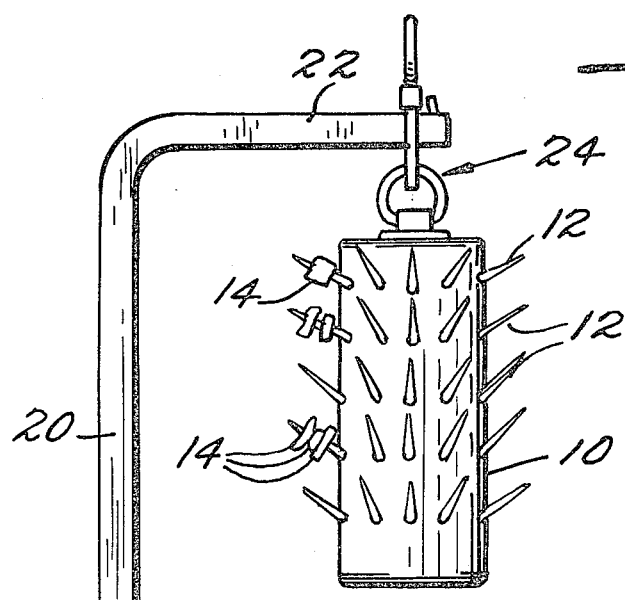
Fig. 1.
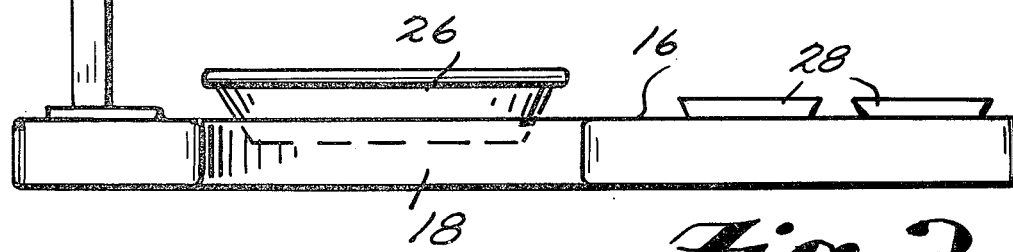
Fig. 2.
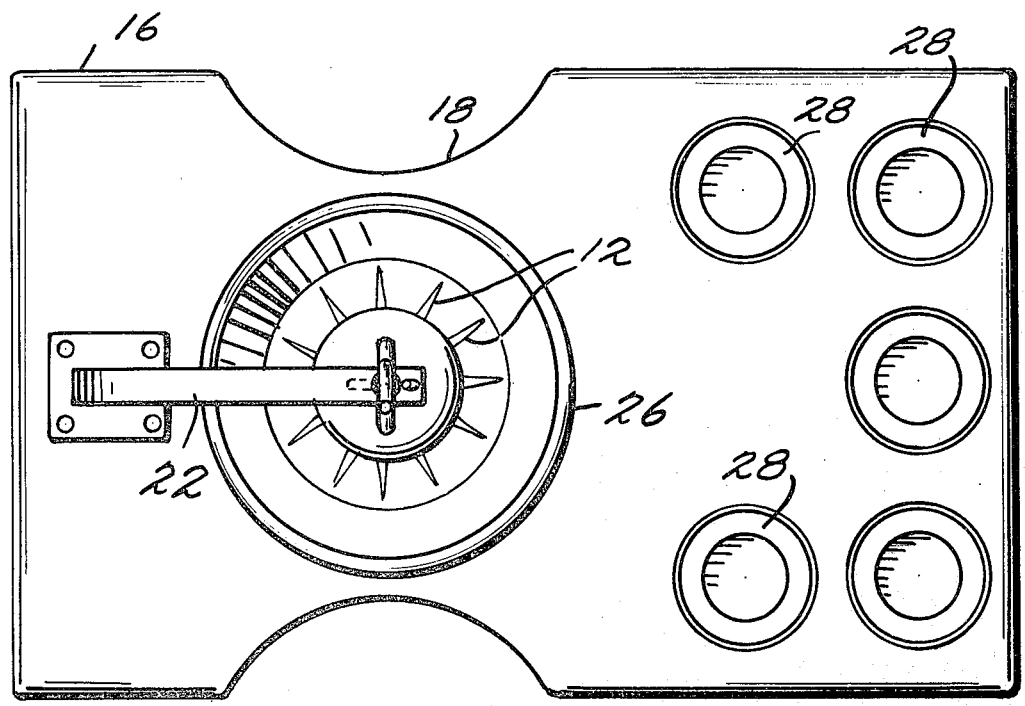

FOOD SERVING DEVICE

BACKGROUND OF THE INVENTION

This invention relates to food serving devices adapted to maintain food warm during serving of the food.

In the food serving art, various devices including small hot plates, heavy metal platters and other heated or heating means have been suggested for use to keep food warm at the table after being cooked. Some casserole structures are known for use in the cooking of food, the vessels serving as a heat sink thereafter to keep the food warm until it can be consumed.

The prior art includes structures such as are shown in U.S. Pat. No. 1,228,556 which is a metal device adapted to be heated for drying corn carried on multiple prongs; U.S. Pat. No. 874,318, another corn dryer; and a broiler bar adapted to have food carried on hooks is shown in U.S. Pat. No. 2,826,982.

GENERAL DESCRIPTION OF THE INVENTION

The food serving device of this invention makes use of a main body adapted to soak up heat and relatively short skewers carried by the body. The device is intended to be placed on or adjacent a table so that the diner may serve himself by selecting and removing food pieces from the skewers. The food pieces are maintained hot by flow of heat from the body to the food either by radiation from the body or by conduction through the skewers or both.

The food pieces to be placed on the skewers may be raw or partially or fully pre-cooked. If the food is raw it may be cooked in situ on the skewers and if partially or fully pre-cooked it may be maintained hot by pre-heating the body before the food pieces are applied to the skewers. Cooking or pre-heating may be accomplished in a variety of ways, as by placing the body in or adjacent a radiant heat source such as a broiler, or in an oven, or by heating the body internally. Internal heating may be accomplished, for example, with an internal electrical heating device or with a mass of burning charcoal located within a cavity in the body.

For serving, the body may be suspended from its upper end above the table top with the skewers extending generally horizontally. The support means preferably includes a base which retains one or more small dishes for catching juices dripping from the food and/or for holding sauces in which the food pieces may be dipped after removal from the skewers. Alternatively, the body may be supported from its lower end.

The invention will be further understood from the following more detailed description of an illustrative embodiment, taken with the drawings in which:

FIG. 1 is an elevational view of a food serving device embodying the principles of the invention; and FIG. 2 is a plan view of the device.

The illustrative serving device includes a body 10 and a plurality of pointed skewers 12 extending upwardly and horizontally outwardly from the body 10 for holding pieces of food 14. The body 10 is shown as being generally cylindrical with generally radially projecting skewers 12 carried on the whole of its curved surface. The material from which the body 10 is constructed may be any inert material capable of withstanding the heat to which it is to be subjected during use. Stainless steel is a preferred material in that it will absorb adequate heat to maintain the food pieces 12 hot and is resistant to corrosion. Aluminum alloy is also suitable. The body 10 should have sufficient mass to hold considerable heat, and it may be solid or hollowed to some extent so as not to be overly heavy for manual handling. A cavity may be provided in the body 10 for receiving charcoal or an electric heating element. If desired, an electric heating element may be permanently incorporated during manufacture.

The skewers 12 are rather closely spaced to each other but are spaced sufficiently to permit each skewer to carry one or more food pieces 14. It is intended that the food pieces 14, such as cubes of meat, be rather small, perhaps of bite-size or somewhat larger. A given skewer 12 may hold one food piece 14 or it may hold several pieces of meat, tomato, onion or other vegetable alternating with each other in the nature of a shish kebab. For the latter purpose some of the skewers 12 may be made longer than the others.

The food pieces 14 can be partially or fully cooked prior to placement on the skewers 12 in which case the body will be preheated so as to maintain the pieces 14 hot for a considerable period of time. Alternatively, the food pieces 14 may be placed on the skewers 12 while raw and cooked in situ as by placing the device in an oven or before a bed of coals or by heating the body 10 internally. As the food cooks, the body 10 absorbs heat so that after the cooking process has been completed the food remains hot as a result of heat flowing out of the body to the food. The heat flow will include radiation directly from the body and conduction through the skewers 12 provided that the latter are good heat conductors.

When the cooking and/or loading of previously prepared food pieces 14 onto the skewers 12 has been completed, the body 10 may be moved to a supporting stand for serving the food at a table. The stand includes a base 16 contoured with lateral cutouts 18 to permit dinner dishes on a dining table or serving table to nest snugly next to the food being served. The body 10 is suspended above the base 16 as by means of a vertical post 20 having a horizontal arm 22 at its upper end. Any suitable connection 24 may be provided for removably attaching the body 10 to the free end of the arm 22. As shown, the connection includes two interconnected rings one of which is hooked over the arm 22 and the other of which is permanently connected to the upper end of the body 10 so as to provide for limited swiveling movement of the body 10. This permits the body 10 to be turned by the diners so that the latter may select different food pieces. Alternatively, it may be desirable to employ a connection which holds the body in a given position.

The base 16 includes a recess in its upper surface for receiving a dish 26 positioned directly under the body 10. The dish 26 may be filled with food such as rice which will be consumed along with the food pieces 14, and the drippings from the latter add flavor to this food. Additionally, several smaller dishes 28 may be supported in recesses in the upper surface of the base 16 of the stand to hold different condiments into which the food pieces 14 may be dipped by the diners after removal from the skewers 12. For this purpose it is contemplated that each diner will be provided with a pair of tongs suitable for gripping a food piece 14.

The use of the food server has been generally described above in connection with the description of the structure of the device. Initially the food to be served is cut into relatively small pieces which are then prepared in any desired manner as by marinating and/or partially or fully cooking. If the food pieces 14 require only serving, they are placed on the skewers 12 after the body 10 has been preheated sufficiently to maintain the food pieces 14 hot by heat flow from the body 10. Full or partial cooking of the food pieces 14 in situ on the skewers 12 may be accomplished by heating the food-loaded body 10 as described above. In either event the food-loaded body 10 is then ready for serving and is placed on the stand to be delivered to a serving table or a dining table. The juices coming from the food are collected in the dish 26 which may be filled with another food compatible with the juices. The cutouts 18 permit dinner dishes to be in a position to catch any drippings falling from the food as it is removed from the skewers. Each diner using a pair of tongs removes selected food pieces 14 and dips them in one or more of the condiments contained in the dishes 28.

Modifications of the illustrated embodiment may be made without departing from the scope of the invention which is defined by the claims.

What is claimed is:

1. A table-top food serving device from which a diner may be served individual pieces of food each of which is maintained in a heated condition, said device comprising: an inert body capable of being heated and constructed of high heat-absorbing and heat-radiating material, said body having a plurality of food-holding skewers fixedly secured to and extending from the outer surface of said body, said skewers being arranged side by side and one above another and each of said skewers being of a size to receive at least one bit-size piece of food, the mass and heat-absorbing properties of said body and said skewers being sufficient, when said body has been heated, to maintain pieces of food on said skewers in a heated condition by conduction and radiation from said body and said skewers; and means for supporting said body in an upright suspended position in which said skewers retain pieces of food placed thereon.

2. A food serving device as in claim 1 wherein said body is a vertically elongated cylinder and wherein said skewers are disposed over essentially the entire vertical surface of said cylinder.

3. A food serving device as in claim 1 wherein said supporting means includes releasable connecting means at the upper end of said cylinder for suspending said cylinder from its upper end and for permitting said cylinder to rotate about its vertical axis.

4. A food serving device as in claim 3 wherein said supporting means includes a vertical post member which carries said releasable connecting means, said post having a lower end connected to a generally horizontal base which is disposed directly under said body.

5. A food serving device as in claim 4 including at least one dish set into an upwardly facing recess in the upper surface of said base.

6. A food serving device from which a diner may be served individual pieces of food each of which is maintained in a heated condition, said device comprising: a stand which includes a post member having a lower end connected to and supported by a horizontal base; a food-supporting body for holding small pieces of food; and means for suspending said food-supporting body from said post member in a position directly above said base, said body having a plurality of skewers fixedly secured to and projecting from the outer surface of said body, said skewers being spaced apart a sufficient distance to permit small pieces of food to be impaled on each skewer, said body and skewers having substantial mass and heat-absorbing properties so that, when said body is heated, substantial heat flows to the pieces of food on said skewers and thereby maintains the food pieces in heated condition.

7. A food-serving device as in claim 6 wherein said suspending means includes a swivel connection which permits said body to swing about a vertical axis, said device including at least one dish supported by said stand in a position below said body.

* * * * *